March 26, 1940. L. A. MAPEL 2,194,605
APPARATUS FOR INDICATING VISCOSITY
Original Filed Jan. 16, 1928
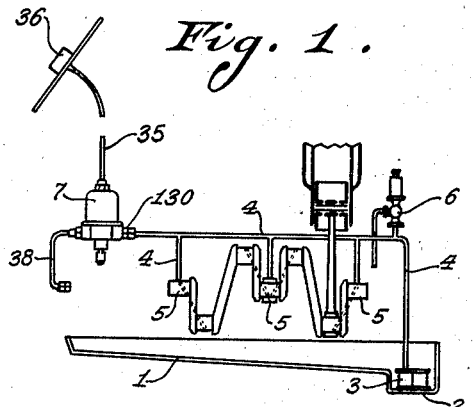
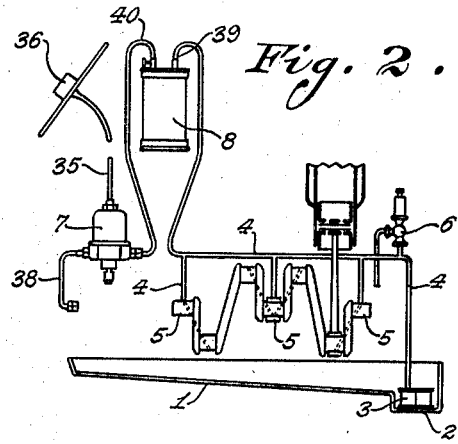
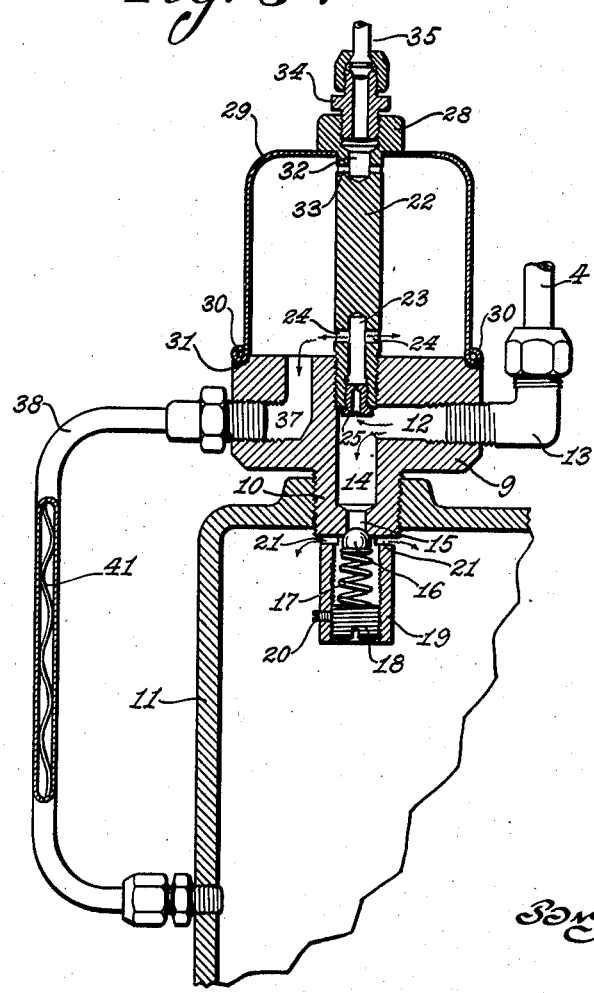
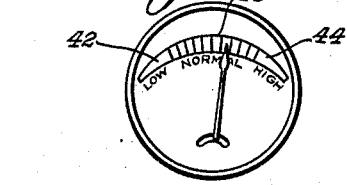
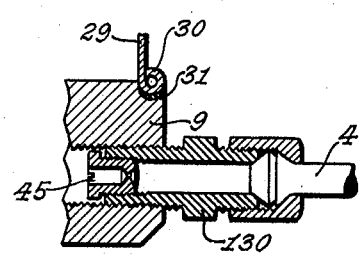
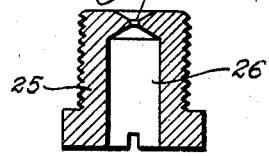
Inventor:
LEWIS A. MAPEL,
By John N. Bruminga
His Attorney.

Patented Mar. 26, 1940

2,194,605

UNITED STATES PATENT OFFICE 2,194,605

APPARATUS FOR INDICATING VISCOSITY

Lewis A. Mapel, St. Louis, Mo., assignor to The Automatic Appliance Company, St. Louis, Mo., a corporation of Missouri Application January 16, 1928, Serial No. 247,000
Renewed December 14, 1935

4 Claims. (Cl. 265—11)

This invention pertains to an apparatus for indicating the viscosity of a liquid. The device is suitable for use for indicating the viscosity of a liquid in any situation in which a flow of liquid can be maintained. It is designed more particularly for the purpose of indicating directly the viscosity of the lubricant in the lubricating system of a machine such as an automobile engine. This application is a continuation in part as to the common subject-matter of application Serial No. 178,950, filed March 28, 1927.

The lubrication of any machine depends for its efficiency upon the viscosity or fluidity of the oil or other lubricant which is used for that purpose.

In the great majority of machines, the lubricating oil is subject to adulteration during the operation of the machine. This is due mainly to the accumulation of foreign matter in the oil, such as dirt, the grindings from the bearing parts which are to be lubricated, and more particularly in the case of automobiles and the like, from gasoline or other liquid which gets into the oil. Such adulteration affects the viscosity of the oil and its lubricating qualities. The accumulation of a considerable amount of gasoline, for instance, will dilute the oil so that its viscosity becomes too low for effective lubrication. As the oil is ordinarily confined in chambers or other parts where it is inaccessible and invisible from the outside, it is desirable to have some means of knowing what the condition of the lubricant is at any time.

One of the objects of this invention, therefore, is to provide an improved apparatus for indicating directly the viscosity of a liquid, which will at any time show the condition of the liquid moving in a system.

Another object is to provide such an apparatus which may be applied to any existing system without affecting the operation thereof.

Another object is to provide an apparatus in which the viscosity of the liquid in such a system may be indicated directly through the agency of pneumatic means, in which the indicator is not brought directly into contact with the liquid.

Another object is to provide an apparatus for indicating directly and continuously the viscosity of the oil in an automobile lubricating system.

Another object of this invention is to provide improved apparatus for indicating directly the viscosity of the liquid in a system, which may easily and conveniently be applied with a minimum of alteration in the system.

Further objects will appear from the following description, taken in connection with the accompanying drawing, which illustrates the invention as applied to the lubricating system of an automobile. In this drawing, Figure 1 shows, diagrammatically, the lubricating system of an automobile to which the method and apparatus of this invention has been applied;

Figure 2 is a similar figure, showing the application to an automobile lubricating system, which includes an oil filter;

Figure 3 is a vertical central sectional view of an apparatus embodying this invention as applied to an automobile lubricating system;

Figure 4 is a front view of the indicator used with this apparatus;

Figure 5 is an enlarged sectional detail of Figure 3; and

Figure 6 is an enlarged sectional view of the orifice plug shown in Figure 3.

The viscosity of a liquid is that property by virtue of which its flow is more or less sluggish. If the viscosity is low, the fluid is said to be thin and will flow freely, like water. If, on the other hand, the viscosity is high, the flow is sluggish, as in the case of syrup and the like. If any liquid is to be made to flow against the action of some obstruction, such as a restricted passage, a pressure must be applied to the liquid to force it through the obstruction. With a thick or highly viscous liquid, a greater pressure must be used than with a thin liquid of low viscosity, in order to effect the same rate of flow. This is due to the fact that the obstruction will impose a resistance to the flow; this resistance is dependent upon the character (length and cross section) of the passage, the rate of flow and the viscosity of the liquid. Accordingly, the counter-pressure set up by an obstruction of a given character to a given liquid flow therethrough may be taken as a measure of the viscosity of the liquid. The present invention is based upon that principle.

The obstruction offered to the flow of a liquid through a restricted passage may, or may not, be materially affected by the viscosity of the liquid. If the passage is short, as in the case of a simple orifice, the viscosity (within limits such as 70–500 Saybolt usually encountered in practice) will have little or no effect on the flow of liquid therethrough. If, on the other hand, the passage has the form of an elongated tube or duct, the flow will be affected to a marked extent by the viscosity of the liquid. The pressures involved in passing the liquid through these passages are also affected differently by the viscosity.

In the case of the simple orifice a higher pressure is accompanied by a greater quantity of flow, and the flow corresponding to a given pressure is practically independent of the viscosity. In the case of the long tube, however, the resistance to flow offered by friction, etc., within the tube, is greater with a high viscosity and a correspondingly greater pressure is required to pass a like quantity of the liquid through the tube.

In accordance with this invention the liquid is passed through two obstructions in succession. The first is in the form of a simple orifice, and the second in the form of an elongated tube. The total pressure acting to pass the liquid through the entire structure is kept constant. The counter-pressure built up by the resistance of the elongated passage varies in accordance with the viscosity of the liquid and may be taken as a measure of that viscosity. One of the features of this invention therefore resides in the fact that the liquid is flowed through an orifice and an elongated passage in succession, while the counter-pressure set up by the elongated passage is impressed upon an indicator and used as an indication of the viscosity of the liquid.

The pressure of a liquid may be indicated by bringing the liquid into contact with any suitable pressure gauge. This arrangement, however, requires, for most installations, that a pipe be led from the point at which the pressure is to be measured, to the indicator, which latter is usually located at a point convenient for reading. When such a connecting pipe is used, an error is introduced into the reading of the indicator by the weight of the liquid column which will fill the connecting tube. If the indicator is higher than the point of the system to which the tube is connected, the weight of this column will be deducted from the indication. If, on the other hand, the indicator is lower than the other end of the tube, the liquid column will add its weight to the indication of the instrument. While in a given situation this may be taken care of by calibration of the instrument, it nevertheless requires an independent calibration for every situation. In order to overcome this difficulty and make the device independent of the location of the indicator, the pressure of the liquid is, according to this invention, imposed upon a body of air by means of which it is transmitted to the indicating head. In such a case the connection from the point to the indicating instrument is simply an air tube, in which the weight of the air column is a negligible quantity.

When such a body of air is used to transmit the pressure to be indicated, difficulties arise in the operation of the device. If the air is completely confined by the liquid, loss of air, due to leakage and absorption by the liquid, is liable to occur. Furthermore, the air volume is liable to become saturated with liquid vapor. This vapor condenses, displacing the air in the chamber, connecting tube and indicator, with the possibility of filling the same partly or wholly with the liquid, thus rendering the device inoperative. In accordance with the present invention, means are provided whereby the air volume, by means of which the pressure is transmitted, is continuously replenished or renewed with fresh air, so that loss and saturation of the air with the vapor are prevented.

In modern automobiles a filter is provided through which a part of the oil is directed during the operation of the engine and the oil pump driven thereby. A branch pipe is taken from the oil line beyond the safety valve and connects with the filter, which latter then discharges the filtered oil back into the crankcase. In this way a definite fraction of the oil passing through the sytem is directed through the filter. A restriction is usually provided at the inlet to the filter so as to not only determine the fraction of oil passing therethrough in order to conform the entire oil flow to the capacity of the pump, but so as to reduce the pressure in the oil filter to a safe value.

Another feature of this invention resides in the fact that the device is so connected with the filter as to take the oil directly therefrom so that the viscosity of the filtered oil is determined and clogging of the device with solid impurities is avoided, while use of this already available oil supply avoids exceeding the capacity of the oil pump and curtailing the supply of oil to the system.

Another feature of this invention resides in the fact that the lubricating system has a pressure gauge which is calibrated to indicate the viscosity of the oil flowing in the distributing means or ducts of the system, and that this gauge will, therefore, indicate, in addition to the viscosity, whether the system is functioning properly. Where the system includes a filter, the gauge is connected with the latter so as to also indicate the proper functioning thereof.

Referring to the accompanying drawing, the liquid system is represented in Figures 1 and 2 as a lubricating system for an automobile. In this drawing, 1 designates the crankcase pan, in which the oil collects after passing the lubricated parts. This pan is provided with a sump 2, which may contain a pump 3 which delivers oil under pressure to the piping system 4, which in turn carries it to the bearings 5 of the machine. Such a lubricating system is usually provided with a relief valve 6, which prevents the pressure in the system from rising to too high a value and discharges oil from the system back into the crankcase so as to maintain such pressure substantially uniform. The device embodying this invention is represented generally at 7, in Figures 1 and 2. The device may be connected directly to the piping system 4, as indicated in Figure 1, or it may be connected through an oil filter 8, as shown in Figure 2.

The device itself comprises a base or body 9 of metal or other suitable material, provided with a threaded extension 10, which may be screwed into or otherwise attached to the crankcase or other casing 11 of the machine to which it is applied. This body has an inlet passage 12 connected by a suitable fitting 13 with the piping system 4, the connection shown in Figure 3 being that used with the installation shown in Figure 2, in which an oil filter is used. The passage 12 communicates with a downwardly extending passage 14 in the extension 10. This passage has a restricted portion 15 closed by a ball valve 16. The ball 16 is held in position by a spring 17 resting on an adjusting screw 18 threaded into the tubular lower end 19 of the extension 10. A set screw 20 locks the adjusting screw 18 in adjusted position. The tubular portion 19 is slotted at 21 opposite the ball 16, so as to permit the discharge of liquid through said slots when the valve is open. The ball spring 16, being adjusted to open at a definite pressure, provides a pressure regulating device adapted to hold the pressure in the passages 12 and 14 constant.

Threaded into the upper end of the passage 14 is a stem 22. This stem is solid throughout most of its length, but is provided at the lower end with an axial bore 23 communicating with outlet passages 24. Into the lower end of the stem 22 and so as to communicate with the bore 23 is screwed an orifice plug 25, shown in detail in Figure 6. This is simply a threaded plug adapted to screw into the end of the stem 22 and having a central bore 26 terminating in a restricted orifice 27. The approaches to the orifice 27 are flared on both sides, as shown in Figure 6.

The upper end of the stem 22 is provided with a head 28. A casing 29 in the form of a cup, of sheet metal or similar material, is soldered or otherwise secured with an air-tight joint to the head 28. The casing 29 has its lower edge rolled, as indicated at 30, and the rim of the body 9 is provided with an annular depression adapted to receive a gasket 31, so that when the stem 22 is screwed into the body 9, the casing 29 will have its rolled edge 30 forced into contact with the gasket 31 to make an air-tight joint. The upper end of the stem 22 is provided with a longitudinal bore 32 communicating by passages 33 with the interior of the casing 29. The head 28 is threaded to receive a fitting 34, by means of which the casing is connected to a pressure pipe 35 leading to the indicator 36, which may be an ordinary air pressure gauge. The indicator 36 may be mounted on the instrument board of the automobile or in any other suitable location convenient for reading.

The body 9 is provided with an outlet passage 37 to which is connected an outlet tube 38 through which the liquid may be discharged from the device. This tube provides the desired resistance to the flow of oil in order to establish the counter-pressure whose indication is a measure of the viscosity. The value of the resistance may be correctly determined and adjusted by means of a wire 41, which may be bent to an irregular shape as shown. It may be passed into the tube 38 so as to bind against its sides to be held in place, and when the proper adjustment has been attained, the excess may be cut off at the end of the tube and soldered or otherwise fixed. The discharged liquid may be returned to the crankcase or the pan 1, or may be otherwise suitably disposed of.

The operation of the device is as follows: Taking the installation of Figure 2, the oil from the piping system 4 is passed through the filter 8 and is then delivered to the device through the passage 12, the restricted passage to the filter inlet being indicated at 39, while the device of the present invention is connected directly to the outlet tube 40 of the filter. By this method of installation, the device 7 is required to handle only a limited quantity of oil and at a reduced pressure as previously explained.

The oil entering at the passage 12 flows into the passage 14. The device, as a whole, operates at a pressure somewhat less than that established by the filter 8, and the relief valve 16 operates to discharge the excess oil not flowing through the resistance tube 38 and maintains a constant pressure in the passage 14. This pressure forces the oil upwardly through the orifice 27 from which it escapes in the form of a jet projected upwardly into the passage 23. This passage acts so as to break the force of the jet and permit the oil to flow quietly out through the passages 24 into the interior of the casing 29. The liquid runs out over the floor of this casing and then out through the passage 37 and the tube 38 and back into the crankcase. The casing 29 is normally filled with air and provides an air chamber in which a body of air is confined in such a way as to have impressed upon it the counter-pressure set up by the resistance tube 38. The air in the chamber is therefore under a pressure which is transmitted to the gauge 36 through the connecting tube 35, and the capacity of the chamber is such that under the highest oil viscosity encountered in practice and the resultant highest air pressure in the chamber, the oil level therein will remain near the bottom thereof, so that oil is prevented from rising into the tube 35. The oil is therefore pumped through the orifice 27 into the chamber 29 against the counter-pressure set up therein by the resistance tube 38, and the gauge 36 connected with the chamber indicates the pressure in that chamber.

The oil under a constant pressure, as determined by the relief valve 16, is flowed through the orifice 27 and into the chamber 29 from hence it flows through the resistance tube 38. With a device as shown in Figure 3, having an orifice of a diameter of 0.035 inch and a copper resistance tube having a length of 8 inches and an internal diameter of 0.127 inch; when the oil pressure as determined by the relief valve is 10 pounds, the normal scale of the gauge 36 will indicate a range of pressures from 1.50 to 3.75 pounds with oils whose viscosities range from 100 to 400 Saybolt. The above is simply given as a practical illustration of one practical embodiment of this invention. The flow through orifice 25 is turbulent while the flow through tube 38 is streamlined.

It will be noted that the viscosity is measured by the counter-pressure set up by the resistance tube 38 when the oil, whose viscosity is to be measured, flows therethrough, and which counter-pressure is impressed on the air in the chamber and indicated by the gauge. The resistance of the orifice 27 does not vary with the viscosity within the limits (70–500 Saybolt) usually encountered in practice. Accordingly, the gauge reading is dependent wholly on the resistance encountered in the tube 38. This facilitates the correction of the resistance in accordance with a definite gauge dial face indicating a definite range of viscosities, in order to take care of variations in tolerances of the resistance tubes and of the orifices 27. A like correction can be secured by adjustment of the safety valve spring 17 so as to vary the pressure of the oil at the orifice.

The gauge may be provided with a scale, such as shown in Figure 4, for convenience of the operator. The scale may be divided into three sections, 42, 43 and 44, representing generally "low," "normal" and "high" viscosity, respectively. When the indicating needle stands opposite any of these sections, the operator will know the condition of his oil. Thus, when the needle stands opposite the "normal" section, the operator will know that his lubrication is in proper condition. As the oil becomes thinned out with use, either by dilution or heat, the needle will drop lower and lower until, when the needle stands near the "low" section, the operator will have warning that the oil must be renewed. The "normal" section may be sub-divided with cross lines, as indicated in the figure, for convenience of the operator in setting for himself a definite working range of viscosity in case he should find that such limitation improves the operation of the machine.

In the usual automobile lubricating system, the pressure varies widely in different makes of automobiles; and in order that the device may be applicable to any type of machine, it is arranged to operate at a sufficiently low pressure as to be below the lowest operating pressure. The pressure of the system may then be reduced to a value suitable for the viscosity indicating device by suitable means. In the installation of Figure 2, this is accomplished by the restriction at the inlet to the filter 8, as described above. This is also useful for reducing the rate of flow to the device to a value suitable for operation of the device. It will be noted that in this installation the device 7 handles only filtered oil. In this case, therefore, there will be little likelihood of the passages of the device becoming clogged with dirt or foreign matter, and there will be practically no liability of interruption of the operation from that cause.

In installations such as that of Figure 1, where no filter is used, the rate of flow may be reduced to a suitable value by inserting an orifice plug 45 in the fitting 130, as illustrated in Figure 5. The orifice plug 45 may be constructed similarly to plug 25, but the size of the orifice will be adjusted to provide the desired reduction of flow.

It will be seen that this invention provides a very simple and effective apparatus for indicating directly the viscosity of a liquid. The indication is continuous so long as the machine is operating, and it follows accurately the variations in viscosity of the liquid. For instance, in the case of an automobile installation, when the motor is started on a cold day, the indicator will show the high viscosity of the oil, due to its low temperature. As the motor warms up, the oil will be heated and the viscosity will be reduced. This change will be duly indicated on the gauge 36, as the needle will move to the left over the scale until the temperature of the oil reaches normal condition; this may be a position on the scale well within the "normal" graduations as, for instance, shown in Figure 4. The gradual thinning out of the oil, due to the absorption of gasoline and the like, will be indicated by the gradual dropping of the gauge reading, which may be over a period of days or weeks, or even longer, according to the service performed. When the gauge reading at normal operating oil temperature is such that the needle approaches "low" position, the operator is given notice to change the oil.

It has been found that by agitation of the oil, such as is caused by the operation of the oil pump of the lubricating system of an automobile, such as the pump 3, the latter is caused to take up air; by then delivering the oil under conditions favoring the release of the air from the oil in the air chamber, the oil is caused to carry a fresh supply of air to the chamber continuously. This agitation takes place during the operation of the system, especially when the oil is returned to the pool in the crankcase, where considerable air is accumulated in the oil. The conditions which promote the release of the air from the oil are the reduction of pressure as the oil enters the chamber 29 and the arrangement of the passages 23 and 24 to break the force of the jet and permit a quiet flow into the chamber and over the floor thereof to the outlet passage 37. As the oil is flowed through the system under pressure, the air bubbles contained therein will become compressed; however, as the oil enters the chamber and the pressure is suddenly reduced, these air bubbles will expand and separate out from the oil and add to the air in the chamber.

Another action of the device also promotes replenishment of the air in the chamber. When the motor is started after an idle period, the temperature thereof is low, the air in the chamber 29 is cool, and the oil being comparatively cool, will have a relatively high viscosity. As the system begins to deliver oil to the chamber, and the pressure therein is built up by the resistance to outflow of oil through the tube 38; the air in the chamber will be compressed and the oil will rise in the chamber to a high level above the bottom thereof. As the motor continues to operate, its temperature rises and, in consequence thereof, the temperature of the oil and also of the air in the chamber is raised. As the air heats up, its expansion forces the oil level in the chamber downward so as to expel some of the oil therefrom. As the oil heats up its viscosity is lowered and the resistance to flow offered by the tube 38 is reduced; in consequence of this the pressure in the chamber is further lowered. This lowering of the pressure is accompanied by expansion of the air, which further lowers the level of the oil in the chamber. As the motor now continues to operate the oil carries a continuous supply of new air which eventually drives the surplus oil from the chamber.

When the motor is operating, it is at a high temperature and keeps the device 7 at a high temperature. The chamber 29 is now full of air at a high temperature and under a pressure somewhat in excess of the atmospheric pressure, as established by the resistance of the tube 38. If the operation of the motor is now stopped, the inflow of oil to the chamber will cease. The pressure of the air in the chamber will then operate to expel the oil from the passage 37 and the tube 38. The high temperature of this air also promotes expansion and assists in this action. With the oil all expelled from the tube 38, the chamber will be placed in direct communication with the atmosphere and the gauge will read zero. A circulation of air thus takes place. Furthermore, as the device cools down, the air in the chamber will contract, so that an actual suction of new air into the chamber through the tube 38 will result. Thus a breathing action is set up which operates to replenish new air between operations of the machine.

It is not necessary that the valve 16 be such as to close perfectly tight. Some leakage is not only permissible, but desirable. If leakage is allowed, the oil in the passage 14 may drain therefrom when the machine is stopped, and the chamber will further be placed in communication with the atmosphere through the passage 14 and the valve 16.

With the air being continually renewed, the saturation thereof with the vapor of the liquid will, of course, be prevented and there will be no danger of interruption on account of liquid condensing in the instrument. This replenishment of the air goes on continuously while the machine is in operation. It has been found in practice that, after a short period of operation, not only does the chamber 29 become filled with air, but the air passes down the passage 37 and occasional minute bubble pass through the tube 38 with the oil. Such bubbles being, however, of a minute character do not interfere with the indication of the gauge 36.

It will be noted that the gauge reads zero when the motor is stopped. If the lubricating system should, for any reason, fail to operate so that no flow of oil is set up, the gauge reading will remain at zero, and the operator will be warned thereby that the system is not functioning. This may happen also when the filter clogs up so that no oil flows through it. This device gives warning, therefore, of faulty conditions in the lubricating system, thereby enabling the operator not only to correct trouble before harm results, but to keep the machine in perfect operating condition. The gauge dial not only indicates that the oil in the lubricating system is flowing under pressure, but also the viscosity of the flowing oil; moreover, the graduated "normal" part of the gauge scale indicates, in connection with the needle, the particular normal viscosity of the oil at the time indicated. Furthermore, the gauge indicates the viscosity of the filtered oil as returned to the crankcase from the oil filter.

This invention has been illustrated as applied to an automobile lubricating system, but it will be understood, of course, that it may be applied to any system or device in or by which it is desired to indicate the viscosity of liquids. The device illustrated is of such a character as to be applicable particularly to automobile lubricating systems. It will be understood, of course, that variations to adapt this invention to other systems are contemplated. It is further understood that certain features, operations and sub-combinations are of utility and may be employed without reference to other features, operations and sub-combinations; that is contemplated by and is within the scope of the appended claims. It is further obvious that various changes may be made, within the scope of the appended claims, in the details of construction without departing from the spirit of this invention; it is, therefore, to be understood that this invention is not limited to the specific details shown and described.

Throughout the foregoing discussion and in the appended claims, the word "air" has been used in a descriptive, rather than a limitative, sense, and is understood to include other gases suitable for the purpose.

Having thus described the invention, what is claimed is:

1. An apparatus for measuring the viscosity of a liquid, comprising, a resistance adapted to oppose the liquid flow, means for flowing the liquid therethrough, an air chamber connected in advance of said resistance so that the air therein is acted upon by the counter-pressure set up by said resistance, means operating to open said chamber to the atmosphere when the liquid flow is stopped, and a pressure gauge connected with said chamber.

2. An apparatus for measuring the viscosity of a liquid, comprising, a resistance adapted to oppose the liquid flow, means for flowing the liquid therethrough, an air chamber connected in advance of said resistance so that the air therein is acted upon by the counter-pressure set up by said resistance, said resistance being connected to drain said chamber when the liquid flow is stopped, means adapted to open said chamber for the entrance of air when the liquid flow is stopped, and a pressure gauge connected with said chamber.

3. Apparatus for continuously indicating the viscosity of fluid, which comprises a small bore friction tube and a capillary orifice in series, said small bore friction tube causing stream line flow and the orifice causing turbulent flow of the fluid passing therethrough, means for maintaining a substantially constant differential between the initial and final pressures of the liquid passing through the apparatus, irrespective of any change that may occur in the fluid, and means for measuring pressure at a point intermediate said restrictions to give an indication of the viscosity of the fluid at any time.

4. In an apparatus for continuously indicating the varying viscosity condition of a lubricant flowing in a circuit for the continuous lubrication of mechanism, the combination with such a circuit and means for causing flow of the lubricant under pressure therein, of a fitting having an inlet provided with conduit connections adapted for connection to said circuit to receive lubricant therefrom in a continuous flow, said inlet having a restricted entrance passage of limited longitudinal extent, an outlet for said fitting having a restricted passage of extended length in comparison with that of said inlet passage, a relief valve connected with said fitting, and a pressure gage connected to said fitting in advance of said outlet passage adapted to indicate the pressure of the lubricant induced by said outlet passage.

LEWIS A. MAPEL.